US006468334B2

(12) United States Patent
Incorvia et al.

(10) Patent No.: US 6,468,334 B2
(45) Date of Patent: Oct. 22, 2002

(54) ELONGATED ABSORBENT UNIT WITH EXTERNAL FLUID COMMUNICATION CHANNELS

(75) Inventors: Samuel A. Incorvia, North Tonowanda, NY (US); Rodney L. Dobson, Greer, SC (US); Leo J. Schwartz, Tonawanda, NY (US)

(73) Assignee: Multisorb Technologies, Inc., Buffalo, NY (US)

( * ) Notice: Subject to any disclaimer, the term of this patent is extended or adjusted under 35 U.S.C. 154(b) by 0 days.

(21) Appl. No.: 09/753,142

(22) Filed: Jan. 2, 2001

(65) Prior Publication Data

US 2002/0083838 A1 Jul. 4, 2002

(51) Int. Cl.[7] .......................... B01D 53/04; F25B 29/04
(52) U.S. Cl. .............................. 96/147; 55/518; 62/509
(58) Field of Search ..................... 95/90, 117; 96/108, 96/147, 148, 149; 55/516, 515, 518, 519; 210/282, 350; 62/94, 509, 474

(56) References Cited

U.S. PATENT DOCUMENTS

| 3,081,137 | A | * | 3/1963 | Kolokythas |
| 3,240,567 | A | * | 3/1966 | Caparreli et al. |
| 3,805,961 | A | * | 4/1974 | Clark et al. ................... 210/350 |
| 4,135,621 | A | * | 1/1979 | Turillon et al. |
| 4,772,300 | A | | 9/1988 | Cullen et al. |
| 5,286,283 | A | * | 2/1994 | Goodell ........................ 96/113 |
| 5,379,833 | A | | 1/1995 | Mathews |
| 5,419,141 | A | | 5/1995 | Burk |
| 5,453,118 | A | * | 9/1995 | Heiligman .................... 96/147 |
| 5,546,761 | A | | 8/1996 | Matsuo et al. |
| 5,582,027 | A | | 12/1996 | Baba et al. |
| 5,709,106 | A | | 1/1998 | Inaba et al. |
| 5,713,217 | A | | 2/1998 | Baba |
| 5,824,140 | A | | 10/1998 | Berger |
| 5,910,165 | A | * | 6/1999 | Haramoto et al. ........... 210/282 |
| 6,139,609 | A | * | 10/2000 | Eimer et al. ................... 96/149 |
| 6,374,632 | B1 | * | 4/2002 | Nobuta et al. ................. 62/509 |

* cited by examiner

Primary Examiner—David A. Simmons
Assistant Examiner—Frank M. Lawrence
(74) Attorney, Agent, or Firm—Joseph P. Gastel

(57) ABSTRACT

An elongated adsorbent unit for use in combination with an elongated refrigerant-containing housing includes a housing having first and second ends, and an interior and an exterior. Adsorbent is compacted in the interior of the housing. First and second porous end members are secured to the first and second ends of the housing, respectively. One or more fluid communication channels extend along the exterior of the housing between the first and second ends of the housing.

17 Claims, 1 Drawing Sheet

ELONGATED ABSORBENT UNIT WITH EXTERNAL FLUID COMMUNICATION CHANNELS

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

The present invention relates to an elongated adsorbent unit especially suited for installation in an elongated receiver integrated with a refrigerant condenser.

In refrigerant receivers, especially those designed for integration with refrigerant condensers, the receiver is generally an elongated housing. Adsorbent is often placed in a cartridge that fits within the narrow interior of such housings. The cartridge has openings that allow the refrigerant to come into contact with the adsorbent. It is desirable that the absorbent be restrained against movement during refrigeration operations within the adsorbent cartridge. It is further desirable to permit the refrigerant to freely enter the adsorbent unit so as to provide efficient adsorbent action. It may also be desirable to restrain the adsorbent cartridge against movement within the receiver, It is with overcoming the foregoing problems that the present invention is concerned.

BRIEF SUMMARY OF THE INVENTION

It is an object of the present invention to provide an elongated absorbent unit for an integrated receiver housing of a condenser with the adsorbent being substantially restrained against movement within the cartridge.

A further object of the present invention is to provide an elongated absorbent unit for an elongated receiver that permits the refrigerant to freely enter the adsorbent unit so as to provide efficient adsorbent action.

Another object of the present invention is to provide an elongated absorbent unit for an elongated integrated receiver of a condenser that has limited ability to move within the receiver.

The present invention relates to an elongated adsorbent unit that includes a housing having first and second ends, and an interior and an exterior. Adsorbent is compacted in the interior of the housing. First and second porous end members are secured to the first and second ends of the housing, respectively. One or more fluid communication channels extend along the exterior of the housing between the first and second ends of the housing.

The present invention also relates to method of forming an adsorbent unit having compacted adsorbent therein. According to the method a housing is provided having first and second ends, and an interior and an exterior. A first porous end member is secured to the first end of the housing. The interior of the housing is filled with adsorbent to a level at which the adsorbent is spaced a first distance from the second end of the housing. A second porous end member is then inserted a second distance into the second end of the housing which is greater than the first distance, to thereby compact the adsorbent.

BRIEF DESCRIPTION OF THE SEVERAL VIEWS OF THE DRAWING

The various aspects of the present invention will be more fully understood when the following portions of the specification are read in conjunction with the following drawing figures wherein.

DETAILED DESCRIPTION OF THE INVENTION

Figure 1:
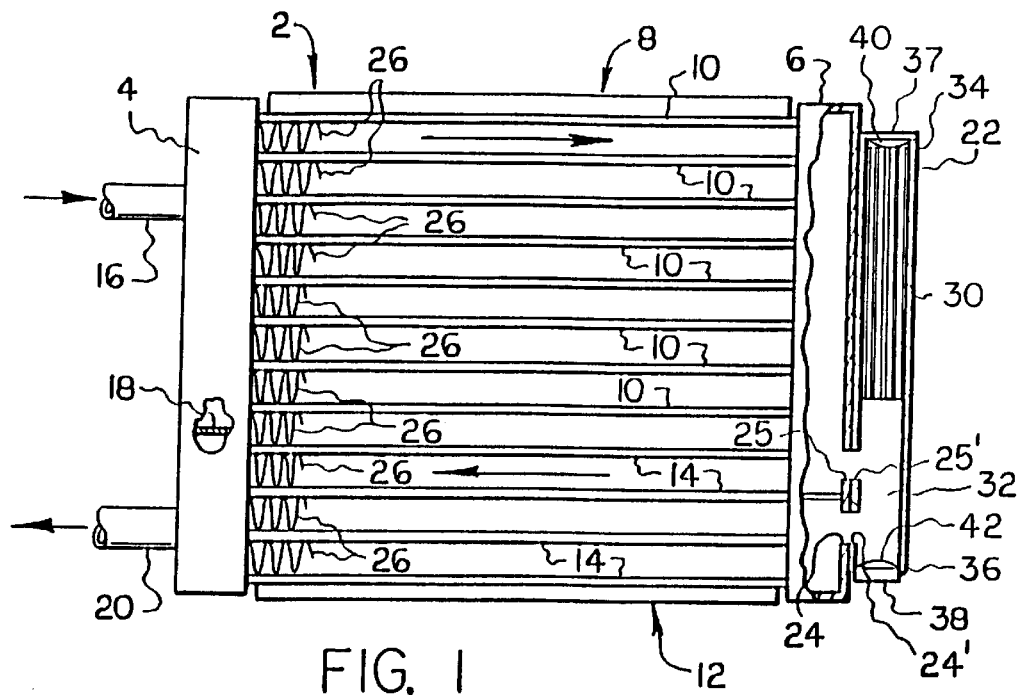
FIG. 1 is a front elevational view of a refrigerant condenser with an integrated receiver, with the receiver and a portion of the condenser being broken away to show a cross-section thereof taken along the axial centerline of receiver.
Figure 2:
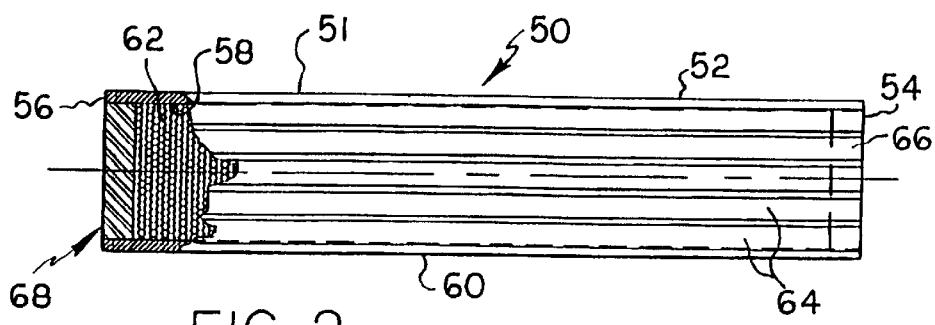
FIG. 2 is a side elevational view of the adsorbent cartridge of the present invention with a portion thereof partially broken away.
Figure 3:
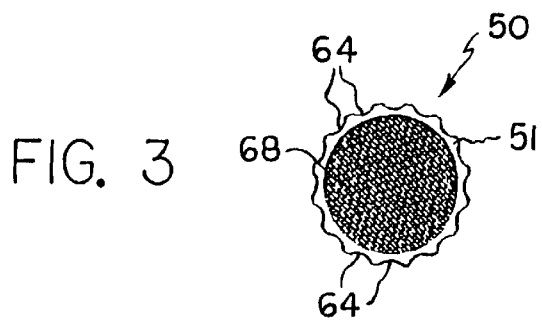
FIG. 3 is an end elevational view of the adsorbent cartridge of FIG. 2.

Turning now to the FIG. 1, a condenser 2 for condensing and cooling a refrigerant is shown in order to illustrate one possible environment in which the present invention could be implemented. The condenser 2 includes a pair of upright hollow headers 4 and 6 interconnected by a condensing core 8 comprising a plurality of hollow refrigerant transfer tubes 10, and a supercooling core 12 comprising a plurality of hollow refrigerant transfer tubes 14. An inlet side of the header 4 includes an inlet 16 that receives high temperature, high pressure gaseous refrigerant from a compressor (not shown). A separator plate 18 separates the incoming gaseous refrigerant from the outlet side of the header 4, which includes an outlet 20. The incoming gaseous refrigerant travels from the inlet 16 through the upper portion of the header 4 into the refrigerant transfer tubes 10 of the condensing core 8. Heat exchange occurs as the gaseous refrigerant passes through the refrigerant transfer tubes 10, such that the refrigerant exits into the header 6 in a condensed partially gaseous/partially liquid phase. The refrigerant travels down the header 6 and enters an elongated receiver 22 through a transfer passage formed by a first pair of matching openings 24 and 24' respectively formed in opposing sidewall portions of the header 6 and the receiver 22, and a second pair of matching openings 25 and 25' respectively formed in opposing sidewall portions of the header 6 and the receiver 22. The gaseous phase of the refrigerant tends to circulate through upper portions of the receiver 22 while the liquid phase of the refrigerant collects at the receiver bottom, and also at the bottom of the header 6. The liquid phase of the refrigerant then enters the refrigerant transfer tubes 14 of the supercooling core 12. Here, further cooling occurs such that the refrigerant exits into the outlet side of the header 4 for passage through the outlet 20 as a supercooled liquid. As can be seen in FIG. 1, the cooling action of the condenser 2 is aided by plural cooling fins 26 placed between the refrigerant transfer tubes 10 of the condensing core 8 and the refrigerant transfer tubes 14 of the supercooling core 12. Although not shown in FIG. 1 in the interest of drawing clarity, the cooling fins 26 extend substantially the entire distance between the headers 4 and 6.

The receiver 22 is constituted as an elongated metal housing 30 that is preferably cylindrical but which could be formed with non-circular cross-sectional shapes as well. It defines an adsorbent unit receiving chamber 32 extending between an open end 34 and an open end 36. The open ends 34 and 36 respectively receive end caps 37 and 38 that have convex interior surfaces 40 and 42, respectively. The end caps 37 and 38 can be secured to the open ends 34 and 36 in conventional fashion, such as by brazing or in any other suitable manner, including by means of detachable connections.

Disposed within the elongated housing 30 is an adsorbent unit or cartridge 50. The adsorbent unit 50 includes a housing 51 made from a suitable plastic material, including but not limited to polypropylene, and having first and second ends 54 and 56, respectively. The housing 51 also includes an interior 58 and an exterior 60. The interior 58 of the housing 51 is packed with adsorbent 62, which is preferably granular molecular sieve but may also be any other suitable adsorbent material including but not limited to silica gel. The exterior 52 of the housing 51 includes one or more fluid communication channels in the nature of fluted configurations 64 extending between the first and second ends 54 and 56 of the housing. It will be appreciated that other configurations which provide fluid communication channels may also be formed in the exterior 52 of the housing 51.

The adsorbent unit 50 further includes first and second porous end members 66 and 68, respectively, at the first and second ends 54 and 56, respectively, of the housing 51. The porous end members 66 and 68 are made of porous polypropylene material, which is obtainable under the trademark POREX. This material is a proprietary product of Porex Technologies of Fairburn, Ga. It is known under the grade designation X-4912. This material has a pore size of about 125–175 microns. Other pore sizes may also be appropriate. The end members 66 and 68 can be installed on the housing 51 by ultrasonic welding, vibration welding or they may be heat staked during assembly.

The adsorbent unit 50 is assembled in a manner now to be described. In a first step, the first porous end member 66 is installed in the said first end 54 of the housing 51 in the above-described manner. The interior 58 of the housing 51 is then filled with the adsorbent 62 to a level at which the adsorbent is spaced a first distance from the second end 56 of the housing 51. Then the second porous end member 68 is inserted a second distance into the second end 56 of the housing 51. This second distance is greater than the first distance to thereby compact the adsorbent 62. Pressure is applied to maintain the second porous end member 68 in this position while it is secured to the housing 51 in the above-described manner.

The function of the adsorbent unit 50 is to remove moisture from the refrigerant that enters the receiver 22 from the condenser header 6 (see FIG. 1). The receiver 22 provides a refrigerant accumulating area where the moisture removal function can be performed. This area also allows gaseous refrigerant to accumulate and condense into liquid form. The adsorbent unit is installed into the adsorbent unit receiving chamber 32 and positioned as shown in FIG. 1 with the second porous end member 68 abutting the convex surface 40 of the end cap 37. Refrigerant enters and exits the receiver 22 via the openings 24/24' and 25/25'. By virtue of the fluid communication channels provided by the fluting configuration 64, the refrigerant can flow along the exterior 52 of the housing 51 and enter the adsorbent unit 50 through the second porous end member 68. In this respect, it is to be noted that the second porous end member 68 abuts the convex surface 40 at is central area so that there is very little contact there between, thereby permitting refrigerant flow through the major portion of the porous end member 68. The convex surface 40 is preferably spherical.

The installation of the adsorbent unit 50 within the adsorbent unit receiving chamber 30 may be with a slidable fit, or it may be with an interference fit wherein the outer ridges of the fluted configurations 64 maintain engagement with the interior 58 of the housing 51. Alternatively, additional structure may be provided to secure the adsorbent unit 50 in position, such as a suitable connection between the adsorbent unit and the receiver 22, or between the adsorbent unit and one of the end caps 37 or 38.

Accordingly, an elongated adsorbent unit has been shown and described. While various embodiments have been disclosed, it should be apparent that many variations and alternative embodiments would be apparent to those skilled in the art in view of the teachings herein. For example, it will be appreciated that the adsorbent unit 50 may be installed in other types of integrated condenser-receiver units. The material used to form the first and second porous end caps 66 and 68 can also be varied. For example, if the adsorbent 62 is not to be compacted, the end caps 66 and 68 could be made from a material such as felted nonwoven polypropylene. The invention, therefore, is not to be limited except in accordance with the following claims, and equivalents thereof.

What is claimed is:

1. In a refrigerant condenser with an integrated receiver having a condensing core with a plurality of refrigerant transfer tubes and an elongated receiver housing in communication with said condensing core, the improvement comprising an adsorbent unit having an elongated adsorbent unit housing within said receiver housing, adsorbent within said adsorbent unit housing, a wall on said adsorbent unit housing having an exterior surface, two spaced porous areas positioned on said adsorbent unit housing, and at least one refrigerant communication channel extending longitudinally on said exterior surface between said two spaced porous areas.

2. In a refrigerant condenser with an integrated receiver as set forth in claim 1 wherein said two porous areas comprise porous end members secured to said adsorbent unit housing.

3. In a refrigerant condenser with an integrated receiver as set forth in claim 2 wherein said porous end members are inserted into the ends of said adsorbent unit housing.

4. In a refrigerant condenser with an integrated receiver as set forth in claim 1 wherein said refrigerant communication channel comprises a fluted configuration.

5. In a refrigerant condenser with an integrated receiver as set forth in claim 1 including a plurality of refrigerant communication channels between said exterior surface and said receiver housing.

6. In a refrigerant condenser with an integrated receiver as set forth in claim 5 wherein said plurality of refrigerant communication channels comprise fluted configurations.

7. In a refrigerant condenser with an integrated receiver as set forth in claim 6 wherein there is an interference fit between said adsorbent unit housing and said receiver housing.

8. In a refrigerant condenser with an integrated receiver as set forth in claim 7 wherein said fluted configurations include ridges, and wherein said interference fit is between said ridges and said receiver housing.

9. In a refrigerant condenser with an integrated receiver as set forth in claim 1 including a convex surface at the end of said receiver housing, and wherein said at least one of said porous areas comprises a porous end member secured to one end of said adsorbent unit housing abutting said convex surface.

10. In a refrigerant condenser with an integrated receiver as set forth in claim 9 wherein the other of said porous areas comprises a second porous end member on said adsorbent unit housing.

11. In a refrigerant condenser with an integrated receiver as set forth in claim 10 wherein there is an interference fit between said adsorbent unit housing and said receiver housing.

12. In a refrigerant condenser with an integrated receiver as set forth in claim 11 wherein said refrigerant communication channel comprises a fluted configuration.

13. In a refrigerant condenser with an integrated receiver as set forth in claim 11 including a plurality of refrigerant communication channels between said exterior surface and said receiver housing.

14. In a refrigerant condenser with an integrated receiver as set forth in claim 13 wherein said plurality of refrigerant communication channels comprise fluted configurations.

15. In a refrigerant condenser with an integrated receiver as set forth in claim 14 wherein said fluted configurations include ridges, and wherein said interference fit is between said ridges and said receiver housing.

16. A refrigerant condenser with an integrated receiver comprising a condensing core, a plurality of refrigerant transfer tubes in said condensing core, an elongated receiver housing in communication with said condensing core, first and second closed ends on said receiver housing, and a convex interior surface on at least one of said first and second closed ends.

17. A refrigerant condenser with an integrated receiver as set forth in claim 16 including a convex interior on both of said first and second closed ends.

* * * * *